United States Patent [19]

Takamiya et al.

[11] Patent Number: 4,591,027
[45] Date of Patent: May 27, 1986

[54] BAND BRAKE ASSEMBLY FOR BICYCLE

[75] Inventors: Kikuzo Takamiya, Kitamoto; Yoshitaka Tamura, Saitama, both of Japan

[73] Assignee: Bridgestone Cycle Co., Ltd., Tokyo, Japan

[21] Appl. No.: 555,086

[22] Filed: Nov. 25, 1983

[30] Foreign Application Priority Data

Dec. 2, 1982 [JP] Japan ................................ 57-210561

[51] Int. Cl.$^4$ .............................................. F16D 49/10
[52] U.S. Cl. ................................ 188/24.11; 188/77 R; 188/249; 192/80
[58] Field of Search ................. 188/249, 259, 77 W, 188/77 R, 24.11, 24.22, 26, 58, 250 H, 2 D, 79.5 GE, 204 A, 218 A; 192/17 A, 17 B, 17 D, 17 R, 80

[56] References Cited

U.S. PATENT DOCUMENTS

| 1,487,947 | 3/1924 | Jones ................................. 188/249 |
| 3,240,293 | 3/1966 | Ferguson et al. .............. 188/2 D X |

FOREIGN PATENT DOCUMENTS

| 215061 | 2/1958 | Australia ........................... 188/77 R |
| 1160242 | 12/1963 | Fed. Rep. of Germany .... 188/77 R |
| 631518 | 12/1927 | France .............................. 188/77 R |
| 642210 | 8/1928 | France .............................. 188/77 R |
| 975032 | 2/1951 | France .............................. 188/77 R |
| 266756 | 2/1928 | United Kingdom ............ 188/77 R |
| 1045736 | 10/1966 | United Kingdom ................ 188/259 |
| 429201 | 10/1974 | U.S.S.R. ....................... 188/79.5 GE |

Primary Examiner—George E. A. Halvosa
Assistant Examiner—Michael P. Gilday
Attorney, Agent, or Firm—Parkhurst & Oliff

[57] ABSTRACT

A band brake assembly for a bicycle includes a brake band having a brake lining and a brake drum to which the brake lining is urged by a brake operating cable in braking. According to the invention, the band brake assembly comprises a wire guide whose front half is in the form of an arc and fixed to an operative end of the brake band and whose rear half extends in a tangential direction of the brake band. An inner wire of the brake operating cable extends rearward along an outer surface of the wire guide and is fixed to a rear end of the wire guide. With this arrangement, the lining, brake band, wire guide and inner wire form a multiple or laminated connection to permit these members to shift slightly with each other when braking, thereby preventing resonance and absorbing or damping vibration caused in braking.

4 Claims, 6 Drawing Figures

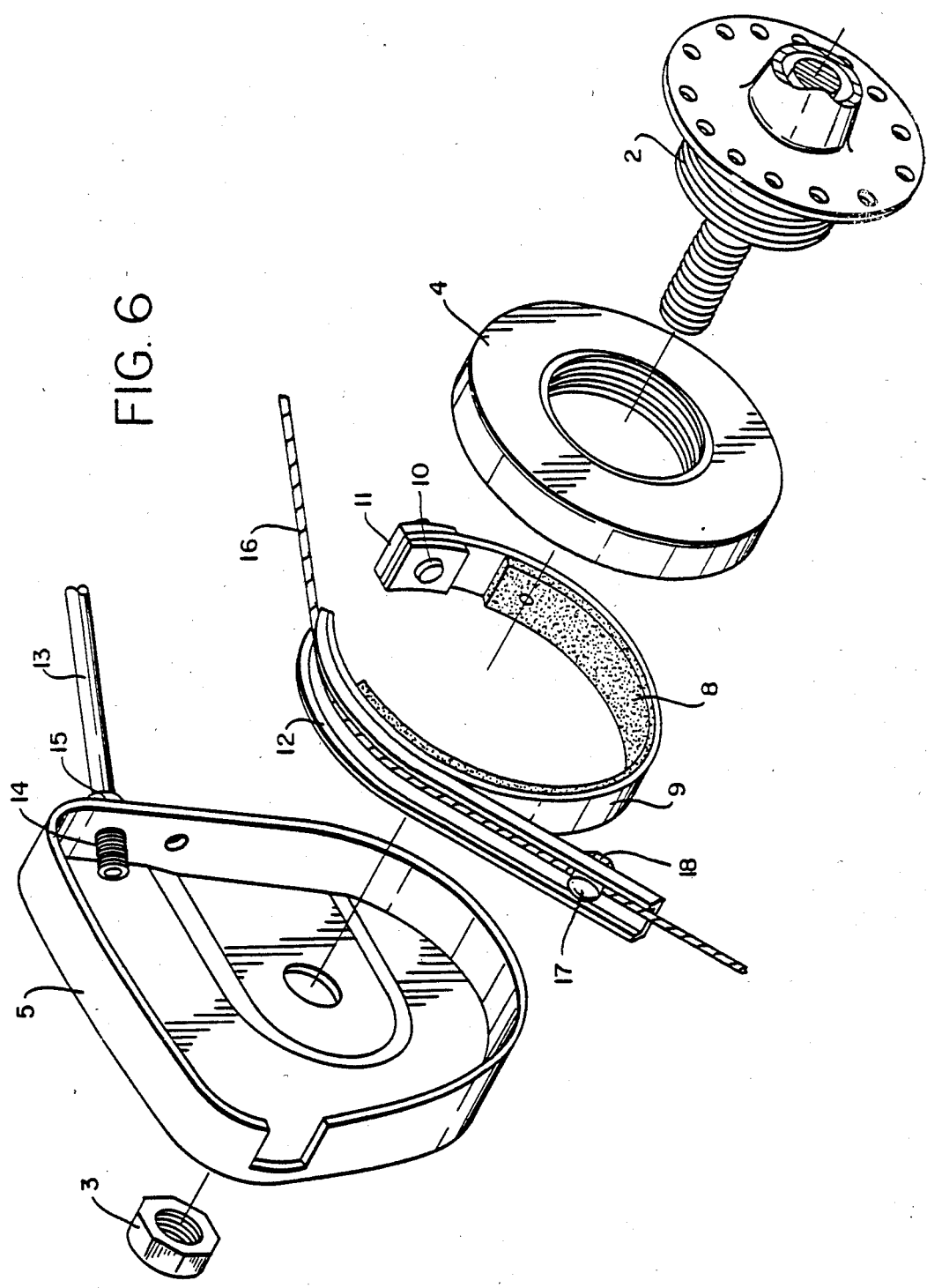

BAND BRAKE ASSEMBLY FOR BICYCLE

BACKGROUND OF THE INVENTION

1. Field of the Invention

This invention relates to a band brake assembly for a bicycle including a brake lining of a brake band adapted to be urged against an outer circumferential surface of a drum to obtain braking force.

2. Description of the Prior Art

In a prior art band brake assembly for a bicycle as shown in FIG. 1, when an inner wire a of a brake operating cable is tensioned for operating the brake assembly, the tensile force is transmitted through a bell crank b to a brake band d integral with a lining c so that a frictional force caused between a drum e and the lining c is supported through a fixed end f of the brake band d by a casing g.

In this manner, when the operating end of the brake band c is directly subjected to a force through the bell crank b by the inner wire a, vibration caused between the lining c and the drum e is transmitted to the casing g to give rise to a resonance phenomenon. In other words, as only the tensile force acts over the entire length of the brake band d, it is likely to go into vibration which in turn causes resonance of the associated parts resulting in discomfort noise.

SUMMARY OF THE INVENTION

It is therefore a general object of the invention to provide an improved band brake assembly for a bicycle, which eliminates the above disadvantage of the prior art by a particular arrangement absorbing vibration generated in a brake band for preventing discomfort noise in braking.

In order to achieve the above object, the band brake assembly for a bicycle including a brake band having a brake lining to be urged to a brake drum by brake operating force acting on a brake operating cable in braking, according to the invention comprises a wire guide consisting of a front half and a rear half, said front half being in the form of an arc and fixed to an operative end of said brake band, said rear half extending in a tangential direction of said brake band, and an inner wire of said brake operating cable, said inner wire extending rearward along an outer surface of said wire guide and being fixed to a rear end of said wire guide.

The invention will be more fully understood by referring to the following detailed specification and claims taken in connection with the appended drawings.

BRIEF DESCRIPTION OF THE DRAWINGS

FIG. 6 is an exploded perspective view of the assembly of FIGS. 2 and 3.

DETAILED DESCRIPTION OF THE PREFERRED EMBODIMENT

Figure 1:
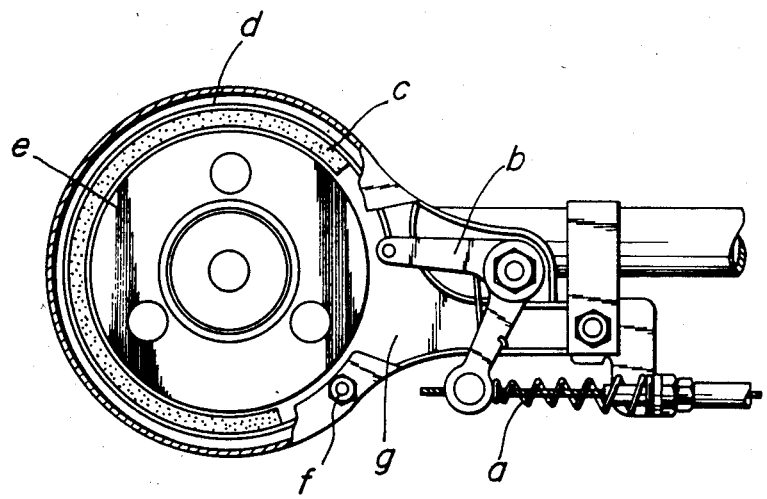
FIG. 1 is a front elevation of a band brake assembly partially in section of the prior art.

A preferred embodiment of a band brake assembly according to the invention shown in FIGS. 2-6 comprises a brake hub 2 fixed to a frame 1 by means of nuts 3, and a brake drum 4 threadedly engaged with a threaded portion of the brake hub 2 and fixed to the brake hub 2. In this embodiment, a casing 5 enclosing the brake drum 4 is fitted on the brake hub 2 and a torque arm 6 extending in front of the frame 1 is fixed to the frame by means of a bolt 7 engaging a deep notch 6a of the torque arm 6.

Figure 2:
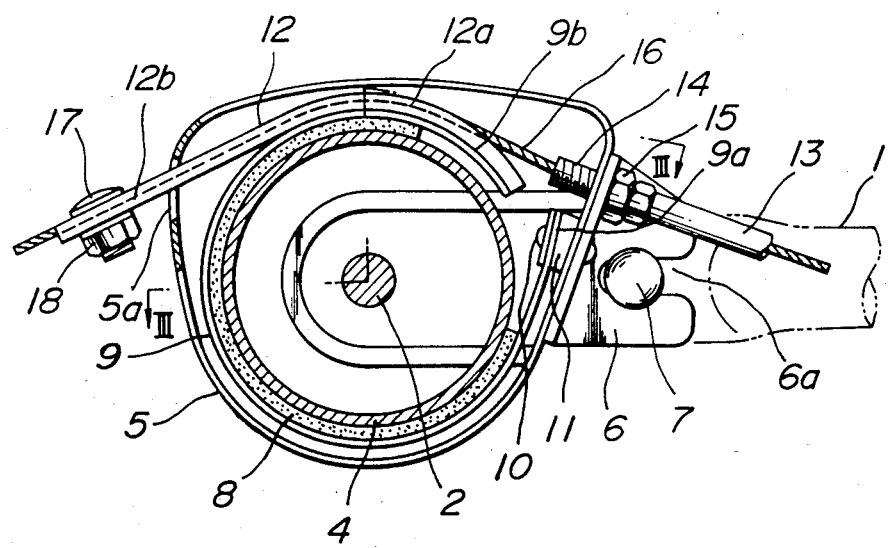
FIG. 2 is a front elevation of a band brake assembly partially in section according to the invention.
Figure 3:
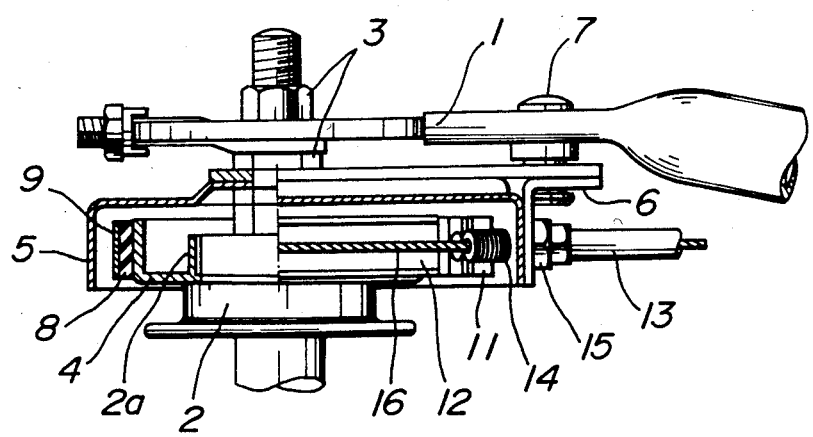
FIG. 3 is a plan view, partially in section taken along lines III—III in FIG. 2, illustrating the assembly shown in FIG. 2.
Figure 4:
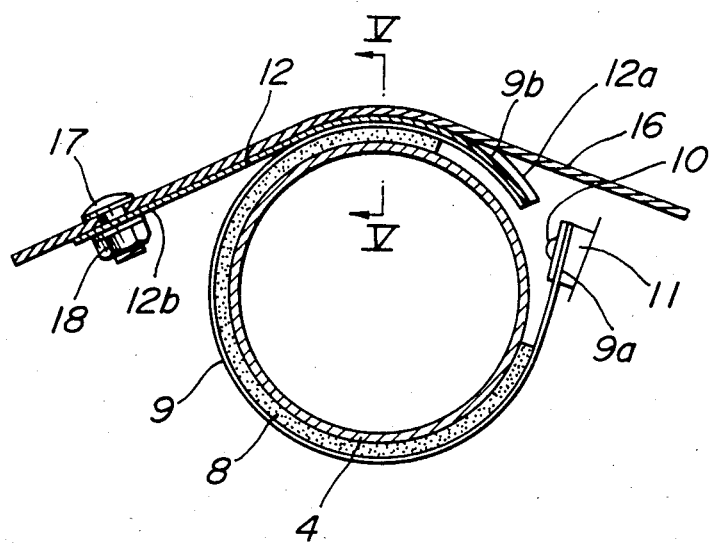
FIG. 4 is a partial sectional view of the assembly shown in FIG. 2.
Figure 5:
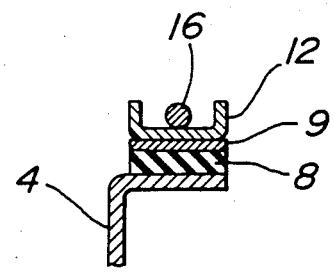
FIG. 5 is a sectional view taken along the line V—V in FIG. 4.

A fixed end 9a of a brake band 9 provided with a lining 8 fixed to its inner surface is fixed through a spacer 11 to the casing 5 by means of a rivet 10. A wire guide 12 consists of a front half 12a and a rear half 12b having a channel-shaped cross-section as shown in FIG. 5. The front half 12a is formed in an arc along an outer circumference of the brake band 9 and is fixed onto an outer surface of an operative end 9b of the brake band 9. The rear half 12b extends in a tangential direction of the brake band 9. A wire adjuster 14 is fixed to one end of an outer wire 13 of a brake operating cable and is also fixed to the casing 5 by means of a nut 15. An inner wire 16 of the brake operating cable extends rearward along the channel of the wire guide 12 and fixed to the wire guide 12 at its rear end by means of a bolt 17 and a nut 18. The casing 5 is formed with an opening 5a through which the rear half 12b of the wire guide 12 extends as shown in FIG. 2.

The band brake assembly constructed as above described according to the invention operates in the following manner. With this arrangement according to the invention as shown in detail in FIGS. 4 and 5, the front half 12a of the wire guide 12 is fixed onto the outer surface of the operative end 9b of the brake band 9 and the inner wire 16 extends on the bottom of the channel of the wire guide 12 and is fixed to the rear end of the wire guide 12 which extends away from the drum 4 in its tangential direction at an appropriate location thereon. Accordingly, the four members, i.e. the lining 8, brake band 9, wire guide 12 and inner wire 16 are overlapped to form a multiple or overlapped connection which is more advantageous than the prior art in view of prevention of vibration due to friction. In other words, when braking, the brake band 9 and the inner wire 16 are subjected to tensile forces and the wire guide 12 therebetween is subjected to a compressive force, so that these overlapped members are slightly shifted relative to each other to prevent the resonance and to absorb and damp the vibration.

In the illustrated embodiment of the invention, the casing 5 of the brake assembly is fitted on the hub 2 and fixed to the frame 1 by means of the bolt 7 which passes through the deep notch 6a of the torque arm 6 extending from the casing 5, thereby enabling the casing 5 to be simply and securely attached to the frame 1.

While the invention has been particularly shown and described with reference to the preferred embodiment thereof, it will be understood by those skilled in the art that the foregoing and other changes in form and details can be made therein without departing from the spirit and scope of the invention.

What is claimed is:

1. A band brake assembly for a bicycle including a brake band having an inner brake lining for urging against a brake drum by a brake operating force acting on a brake operating cable during braking, said assembly comprising: a wire guide consisting of a front half a rear half, and an outer surface extending across said front and rear halves, said front half being in the form of an arc and fixed to an outer surface of an operative end of said brake band, said rear half extending in a tangential direction of said brake band; and an inner wire of said brake operating cable extending rearward the an outer surface of said wire guide such that said front half of said wire guide is located between said inner wire and said brake band and lining in an overlapping relationship, said inner wire being fixed to a rear end of said wire guide to subject said wire guide to a compressive force when a tensile force is applied to said inner wire, brake band and lining during braking, so that the overlapped wire guide, inner wire, brake band and lining are slightly shifted relative to each other to damp vibration.

2. A band brake assembly as set forth in claim 1, wherein said wire guide is made in the form of a channel outwardly opening for receiving the inner wire.

3. A band brake assembly as set forth in claim 1, wherein a wire adjuster for the brake operating cable is fixed to one end of an outer wire of said brake operating cable and is also fixed to a casing of the assembly by means of at least one nut.

4. A band brake assembly as set forth in claim 1, wherein a casing enclosing the brake drum is fitted on a brake hub and a torque arm extending in front of a bicycle frame is fixed to the frame by means of a bolt engaging a deep notch of the torque arm, thereby enabling said casing to be simply and securely attached to said bicycle frame.

* * * * *